US005239317A

United States Patent [19]

Hosaka et al.

[11] Patent Number: 5,239,317

[45] Date of Patent: Aug. 24, 1993

[54] APPARATUS FOR GENERATING IONS IN SOLID ION RECORDING HEAD WITH IMPROVED STABILITY

[75] Inventors: Yasuo Hosaka, Tokyo; Hideyuki Nakao, Kanagawa; Hitoshi Nagato, Kanagawa; Shuzo Hirahara, Kanagawa, all of Japan

[73] Assignee: Kabushiki Kaisha Toshiba, Kawasaki, Japan

[21] Appl. No.: 753,233

[22] Filed: Aug. 30, 1991

[30] Foreign Application Priority Data

Feb. 20, 1991 [JP] Japan .............................. 3-109910
May 31, 1991 [JP] Japan .............................. 3-138008

[51] Int. Cl.$^5$ .............................. G01D 15/06

[52] U.S. Cl. .............................. 346/159

[58] Field of Search .............................. 346/158, 159

[56] References Cited

U.S. PATENT DOCUMENTS 4,160,257 7/1979 Carrish .
4,195,927 4/1980 Fotland et al. .
4,408,214 10/1983 Fotland et al. .
4,409,604 10/1983 Fotland .
4,858,062 8/1989 Hayakawa et al. ............ 346/159 X

FOREIGN PATENT DOCUMENTS 54-78134 6/1979 Japan .
61-184562 8/1986 Japan .
61-255870 11/1986 Japan .

*Primary Examiner*—George H. Miller, Jr.
*Attorney, Agent, or Firm*—Oblon, Spivak, McClelland, Maier & Neustadt

[57] ABSTRACT

An apparatus for generating ions in a solid ion recording head, capable of achieving an improved stability in the generation of high density ions. The apparatus includes: a plurality of ion generation electrodes having a plurality of slit sections; an induction electrode having a width smaller than that of the slit section of the ion generation electrodes; control electrode including a pair of electrodes separated by an insulation layer inserted therebetween; dielectric substrate having an indented portion located on the lower side directly below the induction electrode and facing toward the slit section of the ion generation electrodes; and an insulation layer attached on a lower side of the dielectric substrate.

6 Claims, 10 Drawing Sheets

APPARATUS FOR GENERATING IONS IN SOLID ION RECORDING HEAD WITH IMPROVED STABILITY

BACKGROUND OF THE INVENTION

1. Field of the Invention

The present invention relates to an electrostatic recording apparatus for carrying out an image recording by forming an electrostatic latent image on a dielectric recording medium and developing the formed electrostatic latent image, and more particularly, to an apparatus for generating ions in a solid ion recording head for forming the electrostatic latent image by using ion currents.

2. Description of the Background Art

As an ion recording head for forming an electrostatic latent image by using ion currents, one using a solid ion generator instead of a corona charger is known conventionally. Such a solid ion generator comprises an ion generation electrode and an induction electrode which are arranged on a dielectric substrate. In a solid ion recording head using such a solid ion generator, an acceleration electrode having ion outlet holes in correspondence with recording picture elements is placed in front of such a solid ion generator and a bias voltage as high as the electrostatic latent image contrast is applied to the solid ion generator in accordance with the recording signals, so as to control a flow of the ion currents for forming the electrostatic latent image on the dielectric recording medium.

In such a solid ion recording head using a solid ion generator, the high density ions can be generated and therefore the high speed recording faster than in a laser printer becomes possible, as described in detail in "The 4th international congress on advances in non-impact printing technologies", sponsored by SPSE, p. 394.

As an example of a conventional solid ion recording head, that disclosed in Japanese Patent Application Laid Open No. 54-78134 and U.S. Pat. No. 4,160,257 is shown in FIG. 1.

This solid ion recording head of FIG. 1 comprises an induction electrode 902 provided on one side of a dielectric substrate 901, and an ion generation electrode 903 provided on the other side of the dielectric substrate 901. The ion generation electrode 903 has a slit (or hole) 904 for concentrating the electric field such that the ions can be generated easily. When the alternating voltage 905 is applied between the induction electrode 902 and the ion generation electrode 903, a strong alternating electric field is generated in the slit 904 and the high density ions of positive and negative polarities are generated. Among the positive and negative ions so generated, only the ions of the positive polarity are selected out by a high bias voltage 906 of 1000 to 1600 V which is approximately equal to the electrostatic latent image voltage level applied to the ion generation electrode 903, and are subsequently transferred toward a dielectric recording medium 907. These ions transferring toward the dielectric recording medium 907 are then accelerated by a high acceleration voltage 909 of about 800 to 1200 V applied to an acceleration electrode 908 provided between the ion generation electrode 903 and the dielectric recording medium 907, and reach the dielectric recording medium 907 to form the electrostatic latent image according to the image signals. In this manner, the flow of the ion currents is controlled to be On and Off by using the bias voltage 906. The solid ion recording head has a number of recording head elements such as that shown in FIG. 1 arranged linearly in correspondence with a number of picture elements. Here, a corona charger used in a conventional electrophotography may be used instead of a solid ion generator.

However, such a conventional solid ion recording head has the following problems.

First, in the solid ion recording head, it is necessary to apply a voltage of 1000 to 1600 V which is as high as that of the electrostatic latent image voltage level on the dielectric recording medium 907 to the ion generation electrode 903 as a signal voltage in order to control the ion currents. More specifically, this is achieved by switching a switch 910 in accordance with the image signals and applying the bias voltage 906. As a result, in the electrostatic recording apparatus using such a solid ion recording head, it becomes necessary to use a driving IC of high withstand voltage. However, such a driving IC of high withstand voltage requires a large installation area such that it is not suitable for a high resolution head for which a high density installation is necessary. On the other hand, when the driving circuit is formed by using a driving IC of high withstand voltage and subdivided into matrix driven parts, it becomes difficult to carry out the gradation recording (multi-value recording) by using the pulse width control during the high speed recording and only the binary recording using On and Off control is possible.

Secondly, in the electrostatic recording apparatus using a conventional ion recording head, all the ions generated are transferred toward the dielectric recording medium 907. However, in this manner of recording, the amount of ion generation varies as the ion generation critical voltage changes depending on the surface state of the ion generation electrode 903, so that it has been difficult to form a uniform electrostatic latent image even in a case of a binary recording.

The Delfax Corporation of U.S.A. has developed a solid ion recording head in which the ion currents are On and Off controlled by switching the high frequency high voltage of about 3 $KV_{p-p}$ and 1 MHz to be applied to a solid ion generator for each picture element by using the signal voltages for each picture element, and the binary electrostatic latent image is formed on an insulative layer of the recording medium by using all the ions generated as the generated ions are accelerated by applying the high direct voltage of over 1 KV to a common acceleration electrode having ion outlet holes in correspondence with the picture elements. This solid ion recording head is capable of carrying out the high speed binary recording of up to 330 papers per minute for A4 size paper, and can be operated with only one maintenance operation for printing of a hundred thousand papers.

However, in general, the amount of ions generated by the solid ion generator is greatly affected by the environmental conditions, and because the above described solid ion recording head uses all the ions generated in forming the electrostatic latent image, so that there has been possibilities for the deterioration of the image quality as the amount of ions contributing to the electrostatic latent image varies depending on the environmental conditions. For this reason, the Delfax Corporation uses a crystalline mica for the dielectric substrate of the solid ion recording head because the crystalline mica remains stable for an extended period of time as it is not altered by the nitrate generated by the ion radiation and corona ion generation. This, however, gives rise to a problem that it is difficult to adapt this solid ion recording head to a mass production because of the difficulty in attaching the crystalline mica with a device substrate and forming electrodes on the crystalline mica by using a thick film printing technique.

Also, in such a solid ion recording head, it is necessary to have an accurate agreement between the size and the center of the ion generation hole of the solid ion generator and those of the ion outlet hole of the acceleration electrode for each picture element. When such an agreement is not achieved, the amount of ion generation can be varied, and the fluctuation in the amount of the ion generation determined by the accuracy of manufacturing technique can cause the concentration fluctuation on the recorded image.

Moreover, the solid ion recording head described above is capable of carrying out the high speed recording, but a special type of a driving circuit is necessary because the high frequency high voltage is used for each picture element, so that the size of the driving circuit becomes larger and it is difficult to form this driving circuit in a form of a driving IC.

There is a proposition for manufacturing the dielectric substrate with a material which can be adapted to a mass production by using the thick film printing technique, where the ion generation is stabilized by providing the dielectric substrate in a form of a double layer structure and heaters are used as the electrodes, and where the amount of ion generation can be appropriately controlled by adjusting the frequency of the alternating voltage. However, such a solid ion recording head is structurally equivalent to a capacitive load in which an amount of the alternating current increases when the frequency of the alternating voltage is increased. The power source of a high voltage, high frequency, and a large amount of current is quite expensive and can enlarge the size of the apparatus itself.

As a method of reducing the driving voltage for the ion recording head, there is a method disclosed in Japanese Patent Application Laid Open No. 61-255870 in which a control electric field is provided in a direction perpendicular to the ion current flow transported by a high speed air flow. By using this method, it becomes possible to reduce the driving voltage to be as low as about 30 V, as well as to carry out the multi-value recording, but a complicated electrode structure becomes necessary in order to provide the control electric field mentioned above, and therefore it is not suitable for the high density installation. Moreover, in this method, the speed of recording is determined by the speed of the air flow, and it is difficult to obtain a stable recording.

On the other hand, there is known a method in which a corona charger is used instead of the ion generator, the generated ion currents are pinched down by two control electrodes, and the flow of the ion currents is controlled by the signal voltages between two control electrodes. This method uses a relatively low control voltage of 120 V and is capable of obtaining a high contrast electrostatic latent image. In addition, a usual toner used in a general copy machine can be used for this method, and it is possible to carry out the analog gradation recording at the same quality as that can be obtained by a laser printer in which the gradation is achieved by the concentration of the picture elements, with the resolution lower than that of the laser printer.

However, there is a need to apply the high voltage for ion acceleration between the recording medium and the control electrodes so that it is necessary to bias the driving circuit by the high voltage.

Moreover, the amount of ions that can be generated by the corona charger is limited, so that the recording speed is accordingly limited to about 2 sheets/minute at best.

Furthermore, in this method, it is necessary to provide electrodes for pinching down the ion currents between the corona charger and the control electrodes, and there is a need for having an accurate agreement between the size and the center of the ion outlet hole of these electrodes and those of the ion outlet hole of the control electrodes. When such an agreement is not achieved, the amount of ion generation can be varied greatly, and the fluctuation in the amount of the ion generation determined by the accuracy of manufacturing technique can cause the concentration fluctuation on the recorded image.

In addition, this method uses the corona charger, so that it is difficult to solidify the ion recording head and therefore it is not suitable for the mass production.

Furthermore, the various conventional methods described so far have a problem that the ion recording head is polluted by the floating toner or the residual toner on the recording medium, such that the toner gets stuck in the ion outlet hole for the ion currents and obstructs the flow of the ion currents.

SUMMARY OF THE INVENTION

It is therefore an object of the present invention to provide an apparatus for generating ions in a solid ion recording head, capable of realizing a low voltage driving, a simple electrode structure, a high density installation, a multi-value recording, a uniform and stable electrostatic latent image formation, a compact size, and a mass production.

It is another object of the present invention to provide an apparatus for generating ions in a solid ion recording head, capable of reducing the capacitive load while maintaining a stable generation of high density ions.

According to one aspect of the present invention there is provided an apparatus for generating ions, comprising: a dielectric substrate; ion generation electrode means having a slit section for generating ions in the slit section, provided on a first side of the dielectric substrate; induction electrode means for inducing an electric field for generating ions in the slit section of the ion generation electrode means, provided on a second side of the dielectric substrate above the slit section of the ion generation electrode means, the induction electrode means having a width smaller than that of the slit section of the ion generation electrode means; and voltage source means for applying a voltage between the ion generation electrode means and the induction electrode means, in order to cause a generation of ions at the slit section of the ion generation electrode means.

According to another aspect of the present invention there is provided an apparatus for generating ions, comprising: ion generation electrode means having a slit section for generating ions in the slit section; induction electrode means for inducing an electric field for generating ions in the slit section of the ion generation electrode means; voltage source means for applying a voltage between the ion generation electrode means and the induction electrode means, in order to cause a generation of ions at the slit section of the ion generation electrode means; and dielectric substrate, on a first side of which the ion generation electrode means is provided and on a second side of which the induction electrode means is provided above the slit section of the ion generation electrode means, the dielectric substrate having an indented portion located on the first side directly below the induction electrode means and facing toward the slit section of the ion generation electrode means.

According to another aspect of the present invention there is provided an apparatus for generating ions, comprising: a dielectric substrate; an insulation layer attached on a first side of the dielectric substrate; ion generation electrode means having a slit section for generating ions in the slit section, provided on a first side of the insulation layer; induction electrode means for inducing an electric field for generating ions in the slit section of the ion generation electrode means, provided on a second side of the dielectric substrate above the slit section of the ion generation electrode means; and voltage source means for applying a voltage between the ion generation electrode means and the induction electrode means, in order to cause a generation of ions at the slit section of the ion generation electrode means.

According to another aspect of the present invention there is provided an apparatus for generating ions, comprising: a plurality of ion generation electrode means having a plurality of slit sections for generating ions in the slit sections, where the plurality of ion generation electrode means are arranged at a constant interval to define one of the slit sections between each neighboring ones of the plurality of ion generation electrode means; induction electrode means for inducing an electric field for generating ions in the slit sections of the ion generation electrode means; and voltage source means for applying a voltage between the ion generation electrode means and the induction electrode means, in order to cause a generation of ions at the slit section of the ion generation electrode means.

According to another aspect of the present invention there is provided an apparatus for generating ions, comprising: ion generation electrode means having a slit section for generating ions in the slit section; induction electrode means for inducing an electric field for generating ions in the slit sections of the ion generation electrode means; control electrode means including a pair of electrodes separated by an insulation layer inserted therebetween and having an ion passing hole for controlling a flow of ions generated by the ion generation electrode means and passing through the ion passing hole; driving means for applying a signal voltage indicating a timing for passing the flow of ions through the ion passing hole by being in on state and a timing for not passing the flow of ions through the passing hole by being in off state to the ion control electrode means; and bias voltage source means for applying a bias voltage between the ion generation electrode means and the induction electrode means, in order to cause a generation of ions at the slit section of the ion generation electrode means.

According to another aspect of the present invention there is provided an apparatus for generating ions, comprising: ion generation electrode means having a slit section for generating ions in the slit section; induction electrode means for inducing an electric field for generating ions in the slit sections of the ion generation electrode means; control electrode means having an ion passing hole for controlling a flow of ions generated by the ion generation electrode means and passing through the ion passing hole; and air inlet hole means for entering a flow of air at a positive pressure into a space between the ion generation electrode means and the control electrode means which flows out through the ion passing hole of the control electrode means.

Other features and advantages of the present invention will become apparent from the following description taken in conjunction with the accompanying drawings.

DETAILED DESCRIPTION OF THE PREFERRED EMBODIMENTS

Figure 2:
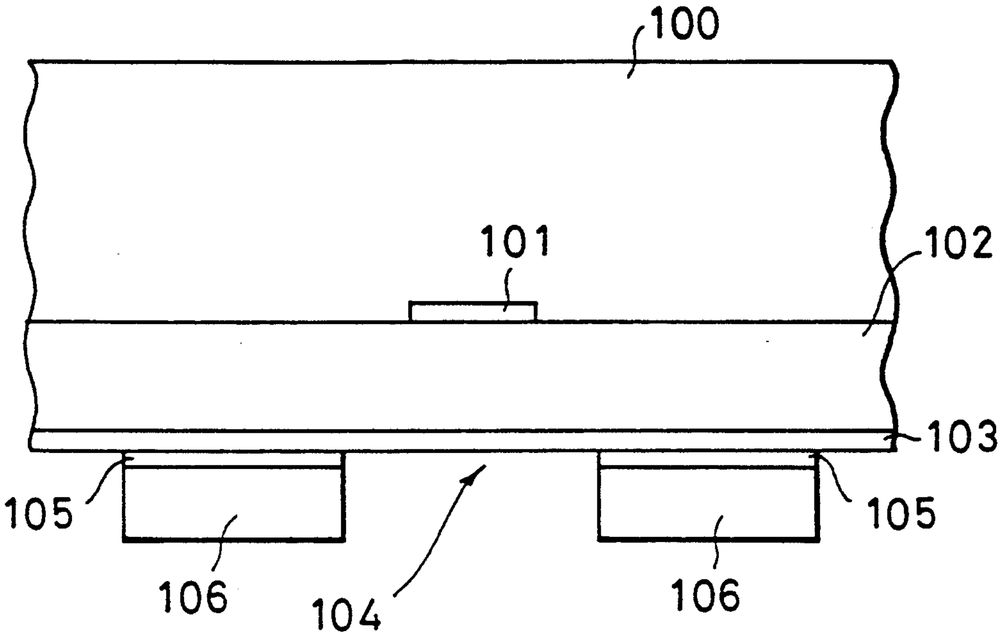
FIG. 2 is a cross sectional view of a first embodiment of an apparatus for generating ions in a solid ion recording head according to the present invention.

Referring now to FIG. 2, a first embodiment of an apparatus for generating ions in a solid ion recording head according to the present invention will be described in detail.

In this first embodiment, the apparatus for generating ions comprises: a ceramic substrate 100; an induction electrode 101 formed on a lower surface of the ceramic substrate 100; a glass dielectric layer 102 formed on the entire lower surface of the ceramic substrate 100 over the induction electrode 101; a polyimide insulation layer 103 formed over an entire lower surface of the glass dielectric layer 102; and ion generation electrodes 106 having a slit section 104 located below the induction electrode 101 on the polyimide insulation layer 103, which are attached to the polyimide insulation layer 103 through nickel adhesive layers 105.

More specifically, this apparatus for generating ions of FIG. 2 is constructed as follows. First, the induction electrode 101 made by a sintered metallic plate of 3–4 μm thickness and 40 μm width is formed on the ceramic substrate 100 of 640 μm thickness by using a thick film printing technique and a sintering technique. Then, on top of this induction electrode 101, the glass dielectric layer 102 of approximately 25 μm thickness is formed over the ceramic substrate 100 by using a thick film printing technique and a sintering technique. Then, on top of this glass dielectric layer 102, the polyimide insulation layer 103 of approximately 5 μm thickness is formed by using a spinner application technique. Next, at appropriate positions on this polyimide insulation layer 103, nickel adhesive layers 105 of few thousand Å thickness and 70 μm width each, which have a strong adherence with respect to the polyimide, are formed by using the thin film printing technique, with the slit section 104 having a width greater than that of the induction electrode 101 formed therebetween. Then, on these nickel adhesive layers 105, the ion generation electrodes 106, each of which is made by a layer of a not easily oxidizable metal such as gold or nickel, are formed by using a metal plating technique, for approximately 15 μm thickness required for the generation of the ions, with the slit section 104 having a width greater than that of the induction electrode 101 formed therebetween.

Here, the induction electrode 101 and the ion generation electrodes 106 are formed such that the slit section 104 has a width wider than that of the induction electrode 101, so that the induction electrode 101 and the ion generation electrodes 106 do not overlap in a vertical direction. With this configuration, the electrostatic capacity of the solid ion recording head can be reduced significantly, up to ⅓ of a conventional solid ion recording head. As a result, an alternating voltage necessary for driving this solid ion recording head can be provided by a relatively cheap alternating voltage source. Also, as a consequence, although the region of the electric field formed at the slit section 104 becomes smaller compared with a conventional solid ion recording head such that 1.25 times the voltage required by a conventional solid ion recording head is necessary for producing the electric field of the same size as that obtained by a conventional solid ion recording head, an amount of currents flowing through the solid ion recording head can be $1.25\times\frac{1}{3}=0.42$ times the amount of currents in the conventional solid ion recording head.

Moreover, the polyimide insulation layer 103 which has a rather low withstand voltage but is strong against the ion irradiations and has a large insulation resistance is provided over the lower surface of the glass dielectric layer 102 which is rather weak against the ion irradiations but has a high withstand voltage, so as to improve the strength of the solid ion recording head with respect to the damaging due to the irradiation of the ions generated in the slit section 104.

Figure 1:
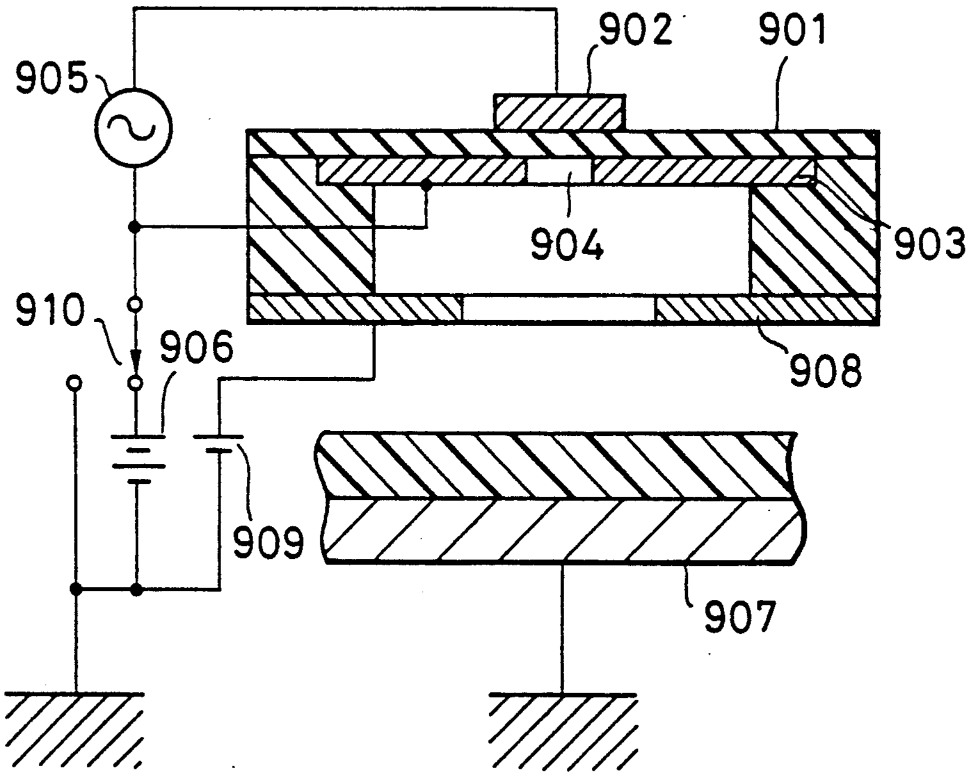
FIG. 1 PRIOR ART
FIG. 1 is a schematic cross sectional view of one example of a conventional solid ion recording head.

Furthermore, this apparatus for generating ions of FIG. 1 has an advantage of being capable of realizing a highly uniform generation of ions, for the following reason.

Namely, in generating ions, as $N_0$ electrons naturally present in the air due to the cosmic rays etc. pass through the air by being accelerated by the electric field E, the electron multiplying coefficient α is increased such that the number of electrons are multiplied and a large amount of electrons can be produced. After the electrons pass through the electric field E, as many ions as the additional electrons produced in the electric field E are generated behind. In order to multiply the number of electrons, it is necessary to provide a sufficient distance x for the electrons to travel through while colliding with the molecules in the air, and a sufficient electric field E to discharge the molecules in the air. The density of the additional electrons produced in the electric field E has the following relationships with respect to the distance x and electric field E.

$$n=N_0/\alpha\cdot\{\exp(\alpha\cdot x)-1\}$$

$$\alpha=p\cdot A\cdot\exp(-B\cdot p/E)$$

where A and B are empirically determined proportionality constants in the air, and p is an air pressure at a time of the ion generation.

Figure 3:
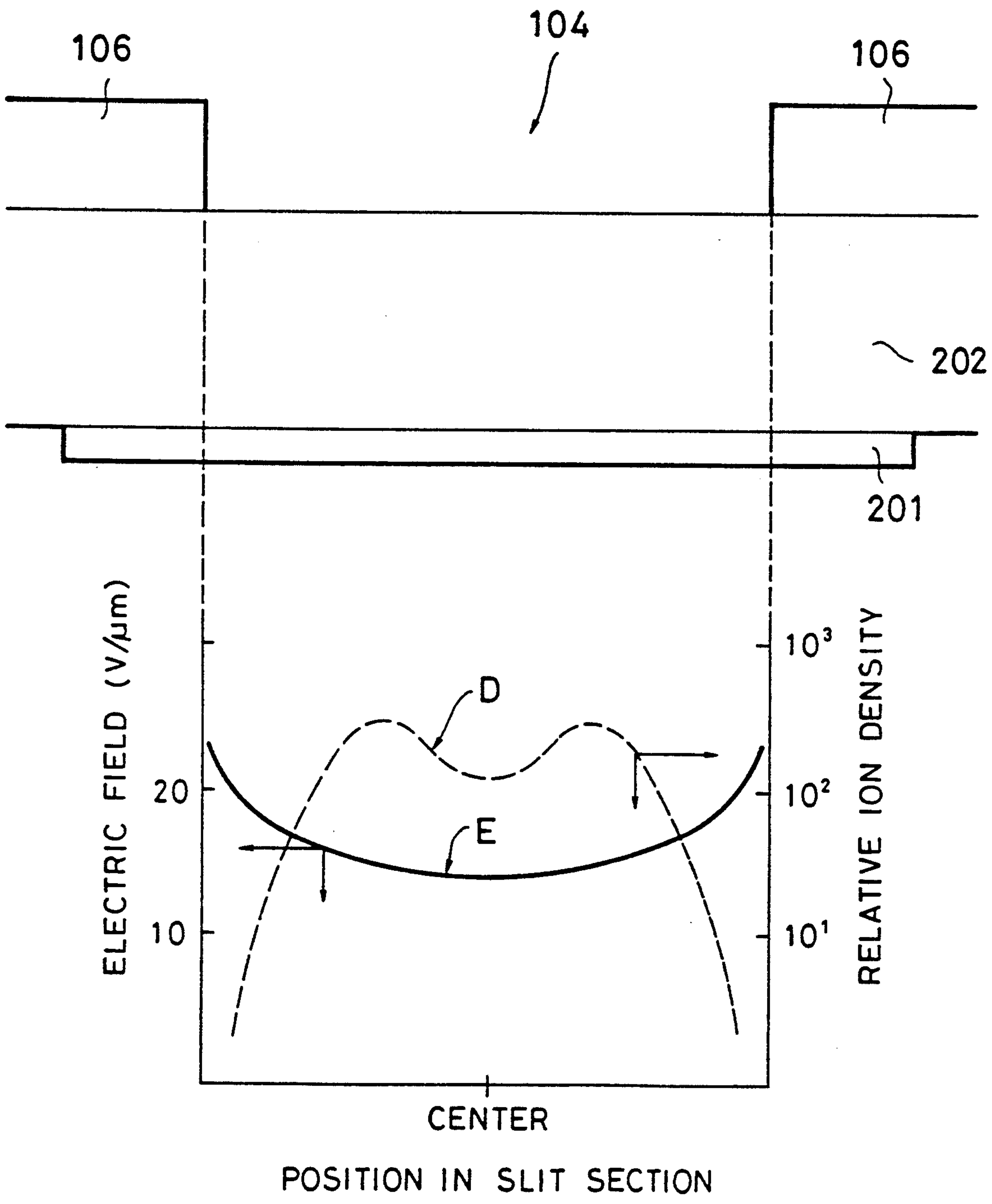
FIG. 3 is a cross sectional view of an exemplary model of an apparatus for generating ions in a solid ion recording head and a graph of the electric field and the generated electron density distribution calculated for this model.

From these relationships, as shown in FIG. 3, the electric field E and the ion density distribution D in a vicinity of a surface of a usual dielectric layer 202 in the slit section 104 can be calculated by using a boundary element method, for a case of applying 2.5 $kV_{p-p}$ alternating voltage to the ion generation electrodes 106 with respect to an induction electrode 201 which has a width larger than that of the slit section 104 with the dielectric layer 202 of 25 μm thickness, the slit section 104 of 100 μm width and the ion generation electrodes 106 of 15 μm thickness. As can be seen from FIG. 3, the electric field E is large at a junction between the ion generation electrodes 106 and the dielectric layer 202, but the travelling distance is short so that the density of the produced electrons is small. Also, the electron multiplying coefficient α takes the largest value around the center of the slit section 104, so that the amount of ions generated becomes maximum around the center of the slit section 104. In other words, the strong electric field in a vicinity of a junction between the ion generation electrodes 106 and the dielectric layer 202 hardly contributes to the generation of ions, but rather contributes to the damaging of the induction electrode 201 due to the irradiation of the ions and electrons generated in the slit section 104.

On a basis of this calculation, the induction electrode 101 is formed to have a width smaller than that of the slit section 104, such that the electric field in a vicinity of the ion generation electrodes 106 is weak. As a result, the deterioration of the surface resistance of the dielectric layer 102 due to the irradiation of the generated ions can be prevented.

Thus, although this configuration of the first embodiment removes a region of the maximum electric field strength between the ion generation electrodes 106, the stable and quite uniform generation of sufficiently high density ions can be realized.

It is to be noted that the insulation layer 103 of this first embodiment may be made from any one of silicon dioxide ($SiO_2$), ditantalum pentoxide ($Ta_2O_5$), trisilicon tetranitride ($Si_3N_4$), and a mixture of oxide and nitride, instead of polyimide as described above.

Figure 4:
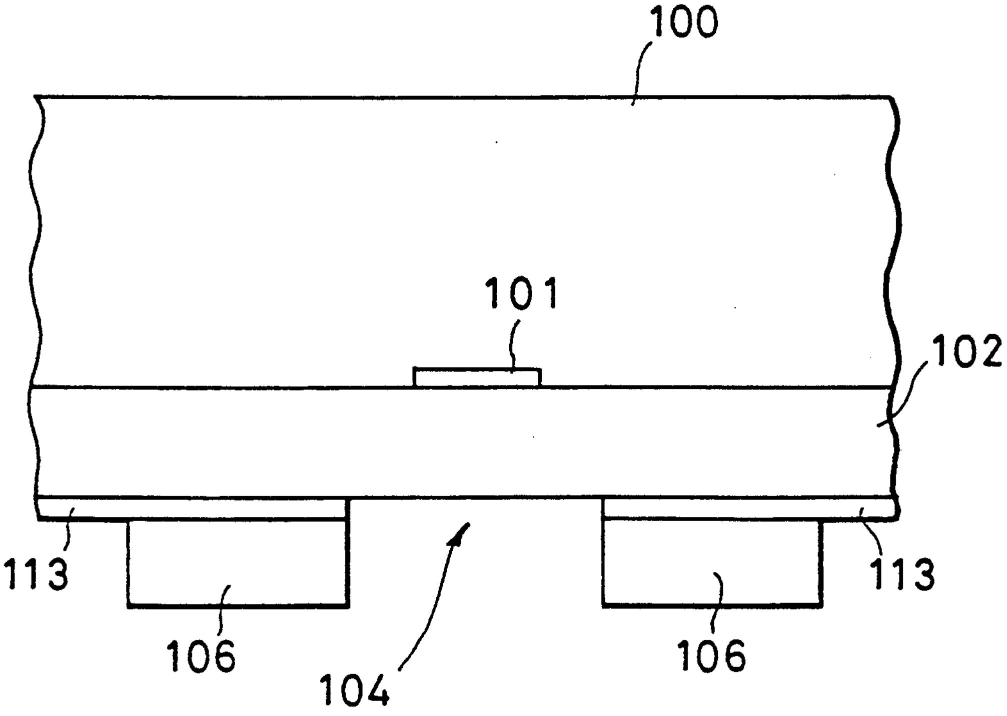
FIG. 4 is a cross sectional view of a second embodiment of an apparatus for generating ions in a solid ion recording head according to the present invention.

Referring now to FIG. 4, a second embodiment of an apparatus for generating ions in a solid ion recording head according to the present invention will be described in detail. Here, those elements which are substantially equivalent to the corresponding elements in the first embodiment described above will be given the same reference numerals in the figure and their description will be omitted.

In this second embodiment, the apparatus for generating ions differs from that of the first embodiment described above in that the polyimide layer 103 in the first embodiment is replaced by two polyimide insulation layers 113 formed on the lower surface of the glass dielectric layer 102 with a slit section 104 located below the induction electrode 101 formed therebetween, on which the ion generation electrodes 106 having the slit section 104 located below the induction electrode 101 are formed directly. Here, again, the induction electrode 101, polyimide insulation layers 113, and the ion generation electrodes 106 are formed such that the slit section 104 has a width wider than that of the induction electrode 101, so that the induction electrode 101 and the ion generation electrodes 106 do not overlap in a vertical direction.

More specifically, this apparatus for generating ions of FIG. 4 is constructed as follows. First, the induction electrode 101 made by a sintered metallic plate of 3–4 μm thickness and 40 μm width is formed on a ceramic substrate 100 of 640 μm thickness by using a thick film printing technique and a sintering technique. Then, on top of this ceramic substrate 100, the glass dielectric layer 102 of approximately 25 μm thickness is formed by using a thick film printing technique and a sintering technique. Next, a polyimide insulation layer 113 of approximately 5 μm thickness is formed uniformly over the glass dielectric layer 102 by using a spinner application technique, and a part of this polyimide insulation layer 113 located at a position of the slit section 104 is removed by using an etching technique, so as to leave the polyimide insulation layers 113 sandwiching the slit section 104. Then, the ion generation electrodes 106 are formed on the polyimide insulation layers 113 by using a thick film printing technique for approximately 15 μm thickness required for the generation of the ions, with the slit section 104 having a width greater than that of the induction electrode 101 formed therebetween.

This configuration for the second embodiment of FIG. 4 has a stronger adherence between each adjacent layers than the configuration for the first embodiment of FIG. 2 described above.

Besides that, all the advantages of the first embodiment described above are also pertinent to this second embodiment.

It is to be noted that the insulation layers 113 of this second embodiment may be made from any one of silicon dioxide ($SiO_2$), ditantalum pentoxide ($Ta_2O_5$), trisilicon tetranitride ($Si_3N_4$), and a mixture of oxide and nitride, instead of polyimide as described above.

Now, in the apparatus for generating ions in a solid ion recording head of the first and second embodiments described above, the surface resistance of the dielectric layer 102 may be reduced by the irradiation of the ions and electrons generated in the slit section 104 onto the dielectric layer 102.

Figure 5:
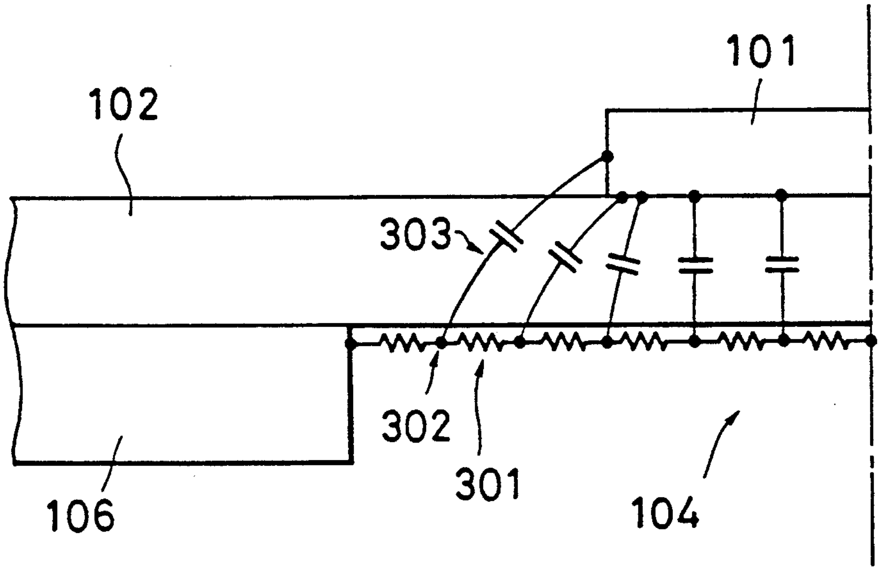
FIG. 5 is an enlarged cross sectional view of a part of an apparatus for generating ions in a solid ion recording head for explaining a reduction of a surface resistance of a dielectric layer due to the irradiation of the ions and electrons.

As shown in FIG. 5, when the alternating voltage for the ion generation is applied between the induction electrode 101 and the ion generation electrodes 106 while the dielectric layer 102 has a reduced surface resistance 301, then the voltage level at a point 302 located some distance away from the ion generation electrodes 106 on the surface of the dielectric layer 102 becomes the same level as the ion generation electrodes 106 as the electrostatic capacities 303 of the dielectric layer 102 are charged sequentially from those located nearby the ion generation electrodes 106. As a result, the electric field cannot be formed in the slit section 104 between the ion generation electrodes 106 and the dielectric layer 102, and the ion generation becomes impossible.

Here, because the electric field formed in the slit section 104 is strongest in an immediate vicinity of the ion generation electrodes 106 as already described above, the reduction of the surface resistance 301 of the dielectric layer 102 progresses from the immediate vicinity of the ion generation electrodes 106. On the other hand, the ions are generated primarily at a middle portion of the slit section 104 as already described above, so that it is necessary to avoid the reduction of the surface resistance 302 of the dielectric layer 102 in a vicinity of this middle portion of the slit section 104, in order to secure the stable generation of high density ions.

This is achieved by a third embodiment of an apparatus for generating ions in a solid ion recording head according to the present invention shown in FIG. 6, which will now be described in detail. Here, again, those elements which are substantially equivalent to the corresponding elements in the first embodiment described above will be given the same reference numerals in the figure and their description will be omitted.

In this third embodiment, the induction electrode 101 and the ion generation electrodes 106 are formed on opposite sides of a dielectric layer 402 such that the slit section 104 has a width wider than that of the induction electrode 101, so that the induction electrode 101 and the ion generation electrodes 106 do not overlap in a vertical direction, as in the first embodiment described above.

The dielectric layer 402 has an indented portion 404 of a thickness smaller than the other portions of the dielectric layer 402, which is located over the middle portion of the slit section 104 directly below the induction electrode 101. Two edges of this indented portion 404 are made into slopes 406 having such an angle of inclination with respect to the horizontal plane that the electric field E formed in the slit section 104 runs substantially parallel to the slopes 406.

More specifically, in this third embodiment, each of the ion generation electrodes 106 has 15 μm thickness and the slit section 104 has a width 80 μm, while the dielectric layer 402 has a thickness equal to 25 μm at the indented portion and 30 μm at the other portions and the slopes 406 has the angle of inclination with respect to the horizontal plane equal to 65° to 70°.

With this configuration, the electric field E formed in the slit section 104 runs substantially parallel to the slopes 406 so that the slopes 406 are unaffected by the irradiation of the ions and electrons generated and therefore the slopes 406 can maintain the constant surface resistance. Consequently, when the alternating voltage for the ion generation is applied, the charging of the electrostatic capacities 303 of the dielectric layer 402 stops at the slopes 406 and therefore the reduction of the surface resistance at the indented portion 404 located in a vicinity of the middle portion of the slit section 104 can be prevented.

Thus, in this third embodiment, the stable generation of high density ions can be secured by providing the slopes 406 which run substantially parallel to the electric field E in the slit section 104. By this third embodiment, it becomes possible to extend the period for generating the sufficient amount of ions from 20 hours to over 100 hours.

It is to be noted that the configuration of the third embodiment described above can also be obtained as shown in FIG. 7 by using two dielectric layers 412 and 422 made by different materials instead of the dielectric layer 402 which is formed as a continuous layer made by a single material. Here, the first dielectric layer 412 on which the induction electrode 101 is formed has a uniform thickness, while the second dielectric layer 422 on which the ion generation electrodes 106 are divided into two sections having the slopes 406 formed on their ends, such that the indented portion 404 is formed between the slopes 406.

Figure 6:
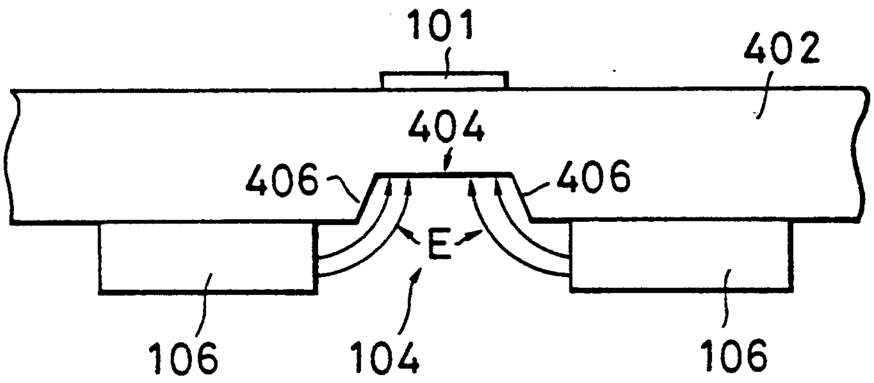
FIG. 6 is a cross sectional view of a third embodiment of an apparatus for generating ions in a solid ion recording head according to the present invention.
Figure 7:
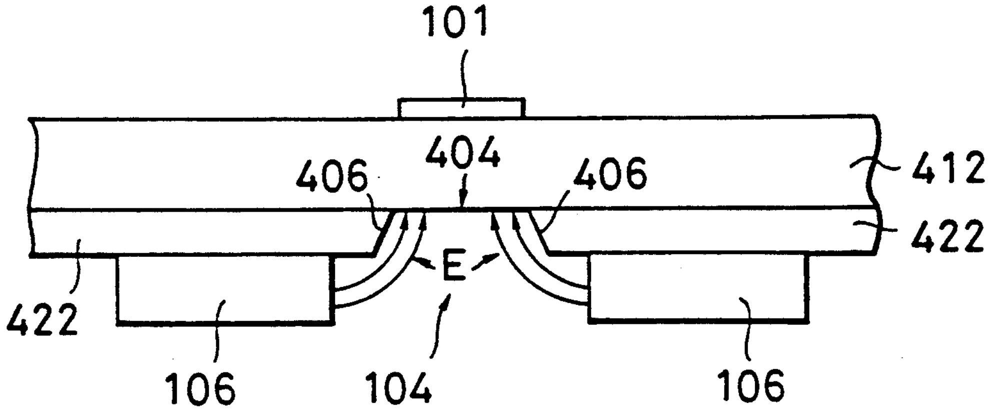
FIG. 7 is a cross sectional view of an alternative configuration for the third embodiment of an apparatus for generating ions in a solid ion recording head according to the present invention.
Figure 8:
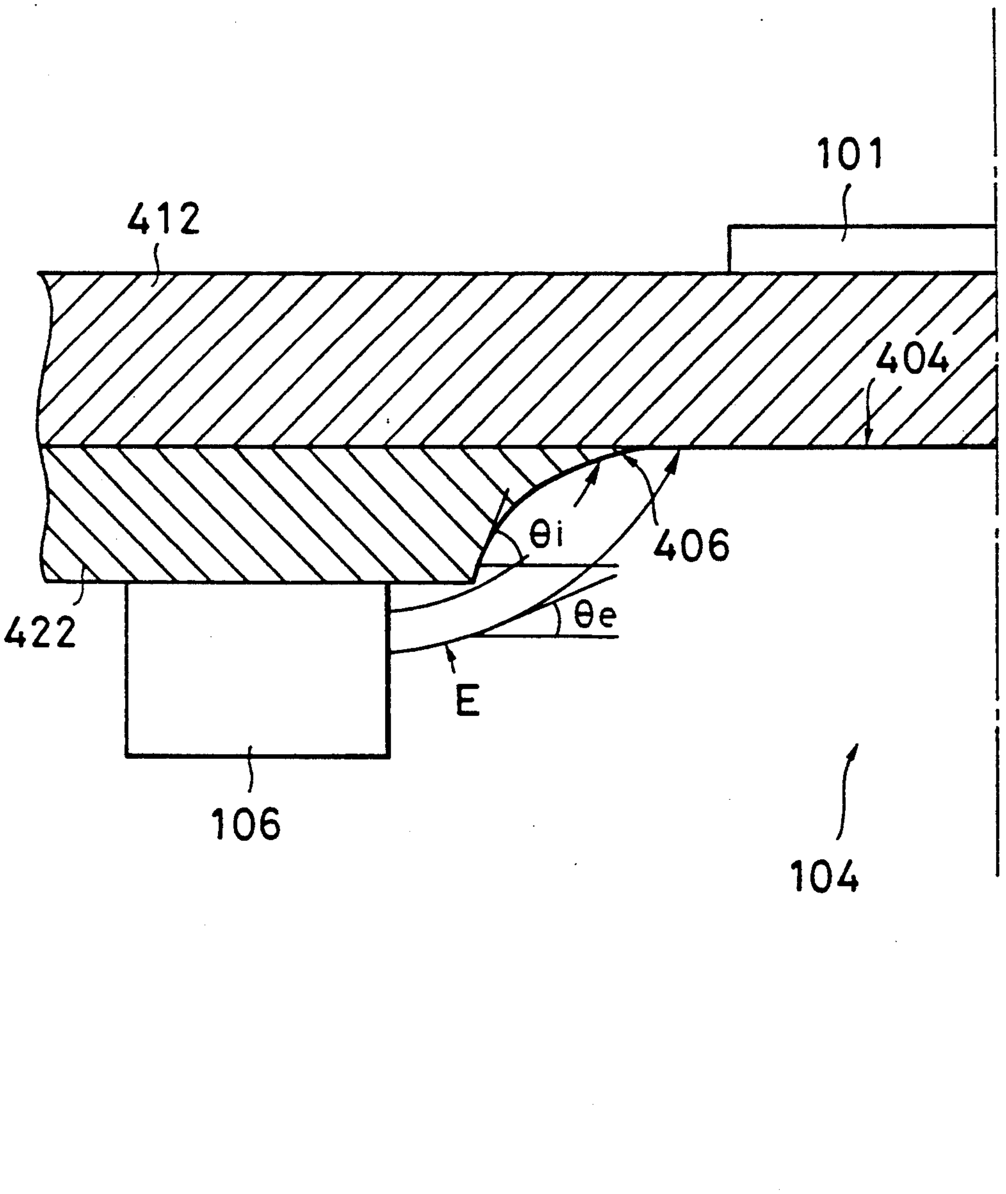
FIG. 8 is an enlarged cross sectional view of a part of the third embodiment of an apparatus for generating ions in a solid ion recording head of FIGS. 6 and 7.

It is also to be noted that, in forming the indented portion 404 by using the thick film printing technique, it is practically rather difficult to form the slopes 406 in forms of flat surfaces as shown in FIGS. 6 and 7. Thus, in practice, the slopes 406 may be formed in forms of curved surfaces as shown in FIG. 8. Even with such slopes 406 in forms of curved surfaces, the presence of a region which runs substantially parallel to the electric field in the slit section 104 on the slopes 406 can prevent the reduction of the surface resistance at the indented portion 404 located in a vicinity of the middle portion of the slit section 104, so that the stable generation of high density ions can be secured.

Here, it should be taken into account that the impact due to the electrons is more damaging to the dielectric layer than the impact due to the ions, and the impact due to the electrons can be avoided effectively by making the angle of inclination $\theta i$ of the slope 406 to be greater than the angle $\theta e$ of the electric field E.

It is further to be noted that the similar effect of securing the stable generation of high density ions can also be obtained to some extent by providing vertical edges between the ion generation electrodes 106 and the dielectric layer 102 as done by the polyimide insulation layers 103 in the second embodiment of FIG. 4 described above, although the effect is limited compared with this third embodiment.

Figure 13:
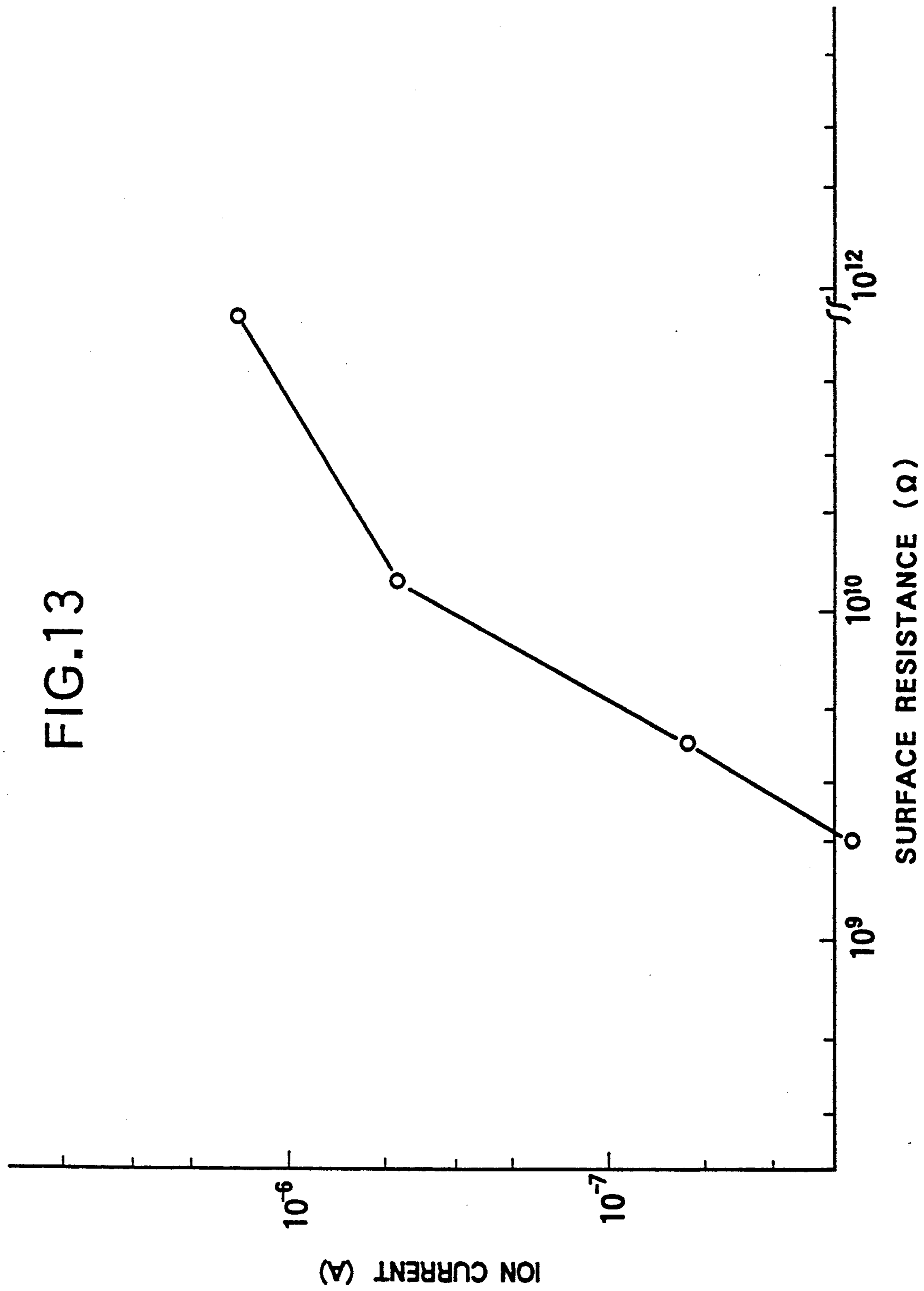
FIG. 13 is a graph showing a limit of deterioration for the surface resistance of the dielectric substrate.

In addition, the use of the material having the surface resistance over $10^9\Omega$ for the dielectric layer also has some effect of securing the stable generation of high density ions. This is because as shown in FIG. 13, the ion current generated from the ion generator can be reduced significantly for the surface resistance below $10^9\Omega$.

Figure 9:
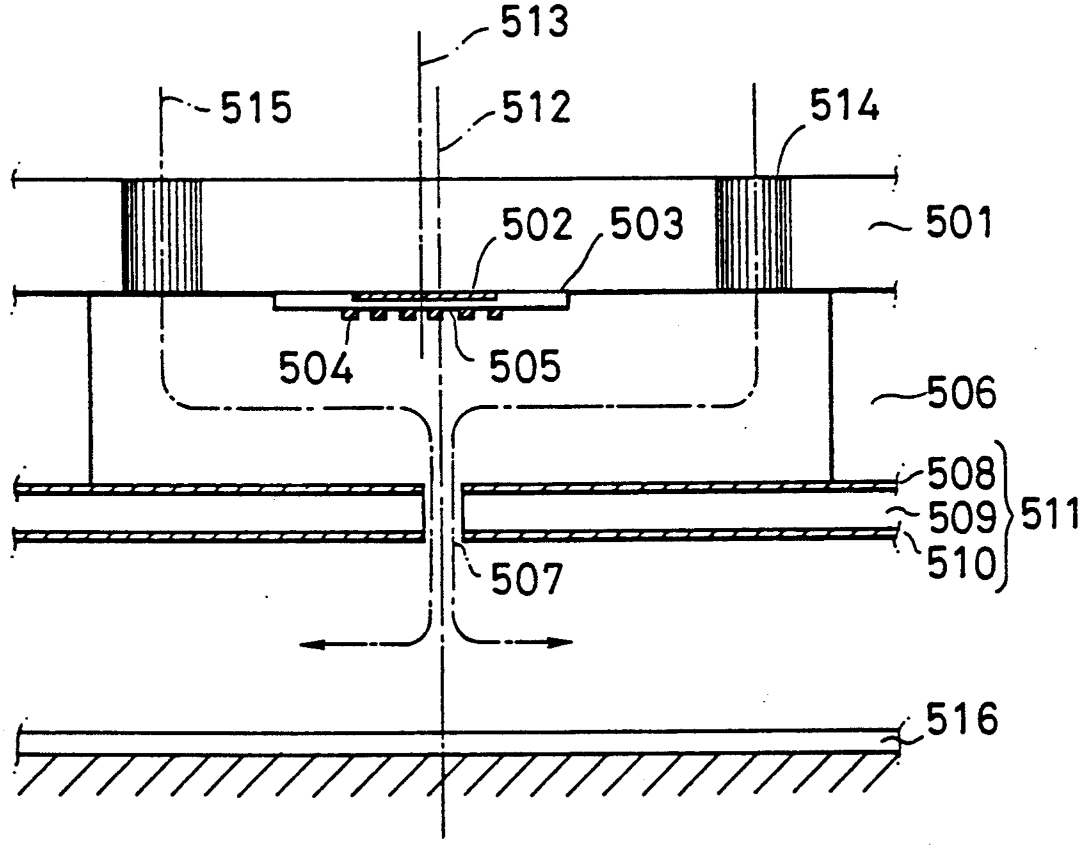
FIG. 9 is a cross sectional view of a fourth embodiment of an apparatus for generating ions in a solid ion recording head according to the present invention.

Referring now to FIG. 9, a fourth embodiment of an apparatus for generating ions in a solid ion recording head according to the present invention will be described.

In this fourth embodiment, the apparatus for generating ions comprises: a ceramic substrate 501 having air inlet holes 514; an induction electrode 502 formed on a lower surface of the ceramic substrate 501; a glass dielectric layer 503 formed on the entire lower surface of the ceramic substrate 501 over the induction electrode 502; a plurality of ion generation electrodes 504 arranged on the lower surface of the glass dielectric layer 503 at a constant interval such that a slit 505 is formed between neighboring ones of the ion generation electrodes 504; and a control electrode 511 having ion passing hole 507 below the ion generation electrodes 504, which is separated from the ceramic substrate 501 by insulation spacer layers 506 where the insulation spacer layers 506 substantially enclose the space between the ceramic substrate 501 and the control electrode 511, and which includes a pair of first and second control electrodes 508 and 510 sandwiching an insulation layer 509.

More specifically, this apparatus for generating ions of FIG. 9 is constructed as follows. First, the air inlet holes 514 of 1 mm diameter each formed on the ceramic substrate 501 at 2 mm intervals by using a laser manufacturing technique. Then, the induction electrode 502 of few μm thickness is formed on the ceramic substrate 501 between the air inlet holes 514 by using a thick film or thin film printing technique. Then, on top of this induction electrode 502, the glass dielectric layer 503 of approximately 20 μm thickness is formed over the ceramic substrate 501 by using a thick film printing technique. Then, on top of this glass dielectric layer 503, a plurality of the ion generation electrodes 504, each of which is made by a layer of metal having approximately 20 μm thickness and 40 μm width, are formed by using a thick film printing technique, at a constant interval of approximately 40 μm. Then, the insulation spacer layers 506 made of Mylar (registered trade mark of Du Pont) sheets of approximately 400 μm thickness each are formed on the ceramic substrate 501 outside a region between the air inlet holes 514. Then, the control electrode 511 formed by the first and second control electrodes 508 and 510, each of which has approximately 20 μm thickness, which are sandwiching the insulation layer 509, is formed on the insulation spacer layers 506, with the ion passing hole 507 located below the center of the ion generation electrodes 504.

Here, the width of the induction electrode 502 is made smaller than that of the ion generation electrodes 504 as a whole, so as to prevent the generation of unnecessary ions due to the electric field leaked from the induction electrode 502.

Also, the thickness of the first and second control electrodes 508 and 510 is selected such that the electric field at a middle of the ion passing hole 507 can be controlled by the low signal voltage to be applied between the first and second control electrodes 508 and 510.

Moreover, the insulation layer 509 separating the first and second control electrodes 508 and 510 has a thickness greater than the width of the slit 505 between neighboring ones of the ion generation electrodes 504 which in this case is equal to 40 μm.

Furthermore, the width of the slit 505 between neighboring ones of the ion generation electrodes 504 is smaller than a diameter of the ion passing hole 507.

With this configuration, as the width of the slit 505 between neighboring ones of the ion generation electrodes 504 is smaller than a separation distance between the first and second control electrodes 508 and 510, the electric field in a vicinity of the control electrode 511 is substantially uniform, so that the ions generated at the slits 505 between the ion generation electrodes 504 reaches to the control electrode 511 uniformly. Consequently, in this fourth embodiment, there is no need to carefully align a central axis 512 of the ion passing hole 507 and a central axis 513 of the ion generation electrodes 504 as a whole, and it suffices for the control electrode 511 to have the ion passing hole 507 at somewhere below the ion generation electrodes 504. As a result, the accuracy required in manufacturing this solid ion recording head can be not so stringent, so that the manufacturing process can be greatly simplified.

Furthermore, in this fourth embodiment, the air having a positive pressure is made to flow along arrows 515 from the air inlet holes 514, through a space enclosed by the ceramic substrate 501, insulation spacer layers 506 and the control electrode 511, to the ion passing hole 507, so as to keep a pressure inside a space between the control electrode 511 and an insulation body 516 of a recording drum to be higher. As a result, the attaching of the floating toner in this space to the ion passing hole 507 can be prevented and the stability of the ion generation operation of this apparatus for generating ions in a solid ion recording head can be improved.

Figure 10:
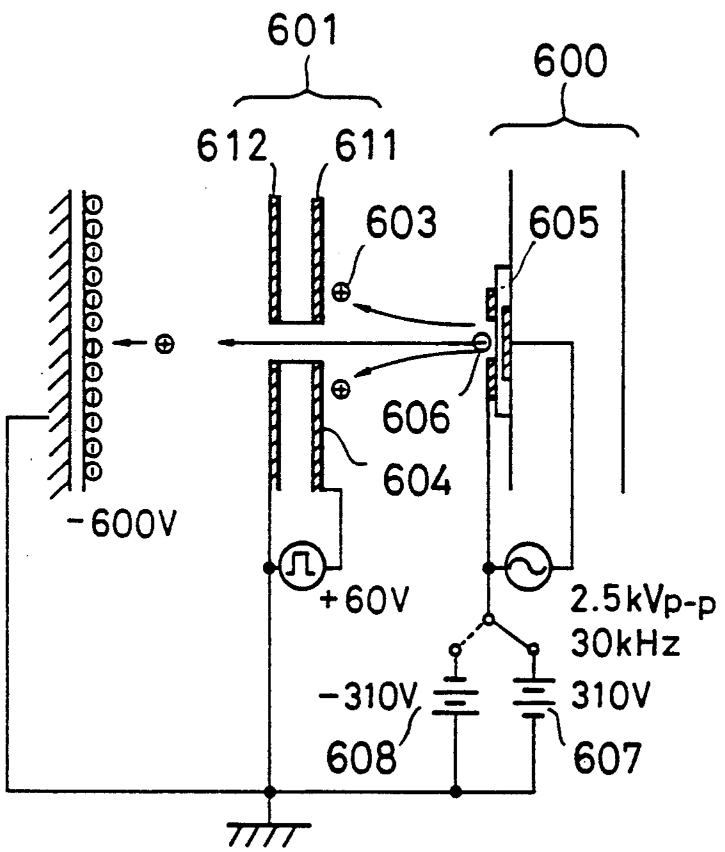
FIG. 10 is a cross sectional view of an exemplary model of a solid ion recording head for explaining a method of stably operating the solid ion recording head according to the present invention.

Referring now to FIG. 10, a method of stably operating a solid ion recording head according to the present invention will be described.

FIG. 10 shows a general configuration of a solid ion recording head in which the flow of the ions of positive polarity generated by a solid ion generator unit 600 is controlled by a control electrode unit 601 by using a low signal voltage applied between a first and second control electrodes 611 and 612.

In this solid ion recording head, a surface of the first control electrode 611 is irradiated by a large amount of the positive ions 603 generated at the solid ion generator unit 600, so that the surface of this first control electrode 611 is oxidized to have an insulative layer 604 formed thereon. As a result, the charges are complied on this insulative layer 604 by the positive ions 603 reaching from the solid ion generator unit 600 to the control electrode unit 601, such that the bias voltage applied to the solid ion generator unit 600 is effectively lowered, which in turn causes a reduction of the ion currents. Especially when the signal voltage to be applied to the control electrodes 611 and 612 is in an off state, all the positive ions 603 flow toward the first control electrode 611, so that if this first control electrode 611 is made from a metal such as a copper, this first control electrode 611 would be oxidized very quickly.

Such an oxidization of the first control electrode 611 and the formation of the insulative layer 604 on the first control electrode 611 can be prevented by forming this first control electrode 611 from a not easily oxidizable metal such as nickel, titanium, stainless steel, or gold, or from a metal such as an aluminum for which an oxidized surface layer can function as a protection layer for preventing further oxidization of an interior region, or else by covering the surface of the first control electrode 611 with a protection layer using a metal plating technique.

Moreover, the oxidized nitrogen ions can be generated from the ions generated by a solid ion generator unit 600, and the nitric acids can be generated from the oxidized nitrogen ions and the moisture in the air, which can affect the first control electrode 611 easily. Thus, in order to prevent this affection due to the nitric acids, it is also preferably to make the first control electrode 611 from a metal which is not easily affected by the nitric acids.

On the other hand, the negative ions 606 not used for the electrostatic latent image formation are complied on a surface of an insulation layer 605 of the solid ion generator unit 600, such that the bias voltage applied to the solid ion generator unit 600 is effectively lowered, which in turn causes a reduction of the ion currents. For this reason, there is a need to remove the negative ions 606 compiling on the insulation layer 605 of the solid ion generator unit 600.

This removal of the negative ions 606 from the insulation layer 605 can be achieved by applying a negative bias voltage 608 to the solid ion generator unit 600 while the signal voltage is in an off state, as opposed to a positive bias voltage 607 to be applied to the solid ion generator unit 600 while the signal voltage is in an on state.

Figure 11:
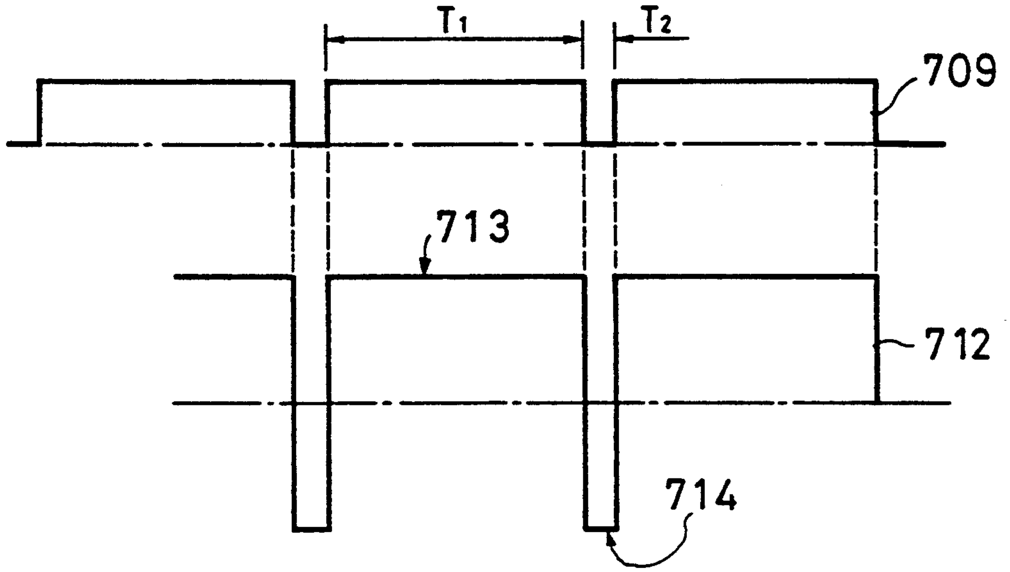
FIG. 11 is a timing chart for explaining a control of a bias voltage in the method of stably operating the solid ion recording head according to the present invention.

More specifically, the bias voltage to be applied to the solid ion generator unit 600 is controlled as shown in FIG. 11.

Namely, the bias voltage is controlled in accordance with a timing pulse 709 indicating timings for consecutively forming electrostatic latent images for a number of recording papers on a recording medium. In this timing pulse 709, a formation period T1 is a period for forming the electrostatic latent image for a single recording paper, which is followed by a pause period T2 before the next formation period starts.

The bias voltage is controlled by a bias pulse 712 synchronized with the timing pulse 709. Here, during the formation period T1, the bias pulse 712 is at a positive level 713 indicating the application of the positive bias voltage 607 while the signal voltage is in an on state. On the other hand, during the pause period T2, the bias pulse 712 is at a negative level 714 indicating the application of the negative bias voltage 608 while the signal voltage is in an off state. Thus, the negative ions 606 compiled on the insulation layer 605 can be removed after every formation of the electrostatic latent image for a single recording paper.

Figure 12:
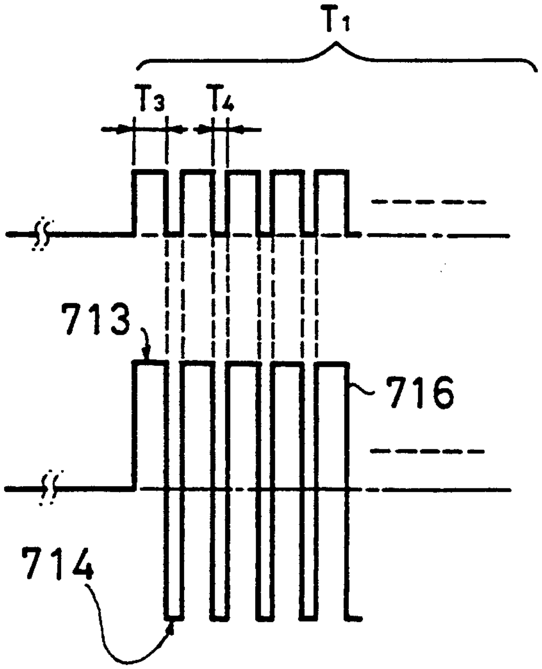
FIG. 12 is a timing chart for explaining an alternative control of a bias voltage in the method of stably operating the solid ion recording head according to the present invention.

Alternatively, the bias voltage to be applied to the solid ion generator unit 600 can be controlled as shown in FIG. 12.

Namely, each formation period T1 of the timing pulse 709 in FIG. 11 actually comprises a number of sub scanning periods T3 during which a plurality of solid ion recording heads are operated in parallel, each of which is followed by a brief sub pause period T4. Accordingly, the bias voltage can be controlled by a bias pulse 716 such that during the sub scanning period T3, the bias pulse 716 is at a positive level 713 indicating the application of the positive bias voltage 607, whereas during the sub pause period T4, the bias pulse 716 is at a negative level 714 indicating the application of the negative bias voltage 608. Thus, the negative ions 606 complied on the insulation layer 605 can be removed after every sub scanning by the solid ion recording heads.

It is to be noted that besides those already mentioned, many modifications and variations of the above embodiments may be made without departing from the novel and advantageous features of the present invention. Accordingly, all such modifications and variations are intended to be included within the scope of the appended claims.

What is claimed is:

1. An apparatus for generating ions, comprising:
   - ion generation electrode means having a slit section for generating ions in the slit section;
   - induction electrode means for inducing an electric field for generating ions in the slit section of the ion generation electrode means;
   - voltage source means for applying a voltage between the ion generation electrode means and the induction electrode means, in order to cause a generation of ions at the slit section of the ion generation electrode means; and a dielectric substrate, on a first side of which the ion generation electrode means is provided and on a second side of which the induction electrode means is provided above the slit section of the ion generation electrode means, the dielectric substrate having an indented portion located on the first side directly below the induction electrode means and facing toward the slit section of the ion generation electrode means, the dielectric substrate further comprising:

a first dielectric substrate having a uniform thickness, on an upper surface of which the induction electrode means is provided; and a second dielectric substrate having a gap for defining the indented portion, on a first surface of which the ion generation electrode means is provided.

2. The apparatus of claim 1, wherein the induction electrode means has a width smaller than that of the slit section of the ion generation electrode means.

3. The apparatus of claim 2, wherein the indented portion of the dielectric substrate has sloping edges.

4. The apparatus of claim 3, wherein each of the sloping edges of the indented portion has such an angle of inclination that the electric field induced in the slit section of the ion generation electrode means in a vicinity of the sloping edges runs substantially parallel to the sloping edges.

5. The apparatus of claim 3, wherein each of the sloping edges of the indented portion contains a region at which the electric field induced in the slit section of the ion generation electrode means in a vicinity of the sloping edges runs parallel to said region.

6. The apparatus of claim 3, wherein each of the sloping edges of the indented portion has an angle of inclination greater than that of the electric field induced in the slit section of the ion generation electrode means in a vicinity of the sloping edges.

* * * * *

UNITED STATES PATENT AND TRADEMARK OFFICE

CERTIFICATE OF CORRECTION

PATENT NO. : 5,239,317

DATED : August 24, 1993

INVENTOR(S) : Yasuo Hosaka et al.

It is certified that error appears in the above-indentified patent and that said Letters Patent is hereby corrected as shown below:

On the title page, Item [30],

The second Foreign Application Priority number, should read;

--3-130081--

Signed and Sealed this

Twenty-second Day of March, 1994

Attest:

BRUCE LEHMAN

Attesting Officer

Commissioner of Patents and Trademarks